(12) United States Patent
Maritzen et al.

(10) Patent No.: US 7,478,068 B2
(45) Date of Patent: Jan. 13, 2009

(54) SYSTEM AND METHOD OF SELECTING CONSUMER PROFILE AND ACCOUNT INFORMATION VIA BIOMETRIC IDENTIFIERS

(75) Inventors: Michael Maritzen, Fremont, CA (US); Kiyo Niwa, Haworth, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 579 days.

(21) Appl. No.: 10/108,121

(22) Filed: Mar. 27, 2002

(65) Prior Publication Data

US 2002/0191816 A1    Dec. 19, 2002

Related U.S. Application Data

(60) Provisional application No. 60/298,423, filed on Jun. 14, 2001.

(51) Int. Cl.
*G06Q 99/00* (2006.01)
*H04K 1/00* (2006.01)
*H04L 9/00* (2006.01)

(52) U.S. Cl. .............................. 705/51; 713/186; 902/3

(58) Field of Classification Search ............. 705/30–39, 705/50–59; 713/186, 155; 902/3; 340/5.52
See application file for complete search history.

(56) References Cited

U.S. PATENT DOCUMENTS

| | | | | |
|---|---|---|---|---|
| 5,280,527 A | * | 1/1994 | Gullman et al. ............. | 713/184 |
| 5,329,589 A | * | 7/1994 | Fraser et al. ............. | 379/91.02 |
| 5,420,926 A | * | 5/1995 | Low et al. ..................... | 705/74 |
| 5,815,665 A | | 9/1998 | Teper et al. | |
| 5,870,723 A | * | 2/1999 | Pare et al. ..................... | 705/39 |
| 5,878,139 A | | 3/1999 | Rosen | |
| 5,878,235 A | * | 3/1999 | Porterfield et al. .......... | 710/112 |
| 5,926,789 A | * | 7/1999 | Barbara et al. ........... | 704/270.1 |
| 5,926,798 A | | 7/1999 | Carter | |
| 6,035,403 A | * | 3/2000 | Subbiah et al. ............... | 726/28 |

(Continued)

FOREIGN PATENT DOCUMENTS

JP    2000276018 A  * 10/2000

(Continued)

OTHER PUBLICATIONS

The latest in anti-piracy efforts: keystroke recognition (Borland, John; CNET News.com, Jun. 13, 2000).*

(Continued)

*Primary Examiner*—Andrew J. Fischer
*Assistant Examiner*—Cristina Owen Sherr
(74) *Attorney, Agent, or Firm*—Blakely, Sokoloff, Taylor & Zafman LLP

(57) ABSTRACT

A system and method for viewing, entering, and editing information. A system and method for entering information through biometric identifiers are described. The invention allows a user to create, edit, and store profile information including secure data and corresponding biometric identifiers. In one embodiment, the invention includes an input module for receiving a biometric input from the user; a matching module coupled to the input module for comparing the biometric input to a plurality of stored biometric identifiers; and an output module coupled to the matching module for outputting a secure data corresponding with one of the plurality of the stored biometric identifiers in response to the biometric input.

16 Claims, 7 Drawing Sheets

U.S. PATENT DOCUMENTS

| | | | |
|---|---|---|---|
| 6,047,268 A | | 4/2000 | Bartoli et al. |
| 6,085,178 A | * | 7/2000 | Bigus et al. .................... 705/80 |
| 6,167,517 A | * | 12/2000 | Gilchrist et al. ............. 713/186 |
| 6,269,348 B1 | * | 7/2001 | Pare et al. ..................... 705/39 |
| 6,270,011 B1 | * | 8/2001 | Gottfried ...................... 705/35 |
| 6,453,301 B1 | * | 9/2002 | Niwa ............................ 705/26 |
| 6,529,885 B1 | | 3/2003 | Johnson |
| 6,816,843 B1 | * | 11/2004 | Baughman ................... 705/64 |

FOREIGN PATENT DOCUMENTS

| | | |
|---|---|---|
| TW | 351799 | 2/1999 |
| WO | WO 0122351 A1 * | 3/2001 |

OTHER PUBLICATIONS

Music to be protected by BioPassword (Thursday, Jun. 15, 2000; Musicrypt.com).*

* cited by examiner

SYSTEM AND METHOD OF SELECTING CONSUMER PROFILE AND ACCOUNT INFORMATION VIA BIOMETRIC IDENTIFIERS

CROSS REFERENCE TO RELATED APPLICATIONS

The present application claims benefit of U.S. Provisional Patent Application No. 60/298,423 filed on Jun. 14, 2001, entitled "Method and Apparatus for Selecting Consumer-Centric Profile and Account Information in a System Enabled Via Biometric Device and User Access Point" listing the same inventors, the disclosure of which is hereby incorporated by reference.

BACKGROUND OF THE INVENTION

Electronic commerce is achieving widespread use. Transactions are performed everyday over the Internet and through point of sale (POS) or bank systems. Such transactions are typically performed after the person requesting access to some information is authenticated and access is given to that person's private information, such as financial, medical, or other type of restricted records. Present systems are designed to maintain the integrity of the user's credit card, debit card, and account number. However, no measures are taken to ensure the secure authentication of the user in order to prevent unauthorized access by a potential thief.

Presently, applications providing access to sensitive information are based upon information that a potential thief may appropriate with relative ease. For example, some of the information presently required to grant access to sensitive material, such as a person's Social Security Number, date of birth, or mother maiden's name, is readily available. Once a potential thief collects any two pieces of this information, the thief may obtain access to the person's financial, medical, or other private information. In addition, most secure access systems are set up to divulge a person's entire file, once they receive the appropriate password and/or correct answers to the security questions. Therefore, a potential thief may steal the person's identity and ruin that person's credit.

Further, current personal transaction devices typically do not allow the user to control the personal transaction device based on the biometric inputs by the user.

SUMMARY OF THE INVENTION

A system and method for entering information through biometric identifiers are described. The invention allows a user to create, edit, and store profile information including secure data and corresponding biometric identifiers. In one embodiment, the invention includes an input module for receiving a biometric input from the user; a matching module coupled to the input module for comparing the biometric input to a plurality of stored biometric identifiers; and an output module coupled to the matching module for outputting a secure data corresponding with one of the plurality of the stored biometric identifiers in response to the biometric input.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following descriptions for the purposes of explanation, numerous details are set forth in order to provide a thorough understanding of the present invention. However, it will be apparent to one skilled in the art that these specific details are not required in order to practice the present invention. In other instances, well-known electrical structures or circuits are shown in block diagram form in order not to obscure the present invention unnecessarily.

A system and method for selecting consumer profile and account information via biometric identifies is enabled through a secure transactional system between different access points are described below. The invention allows a user to utilize various combinations of biometric inputs to select particular information to be utilized by the personal transaction device. In one embodiment, the invention also allows for user authentication through biometric identification. In one embodiment, the invention operates in conjunction with a secured transaction exchange, controlled content access, and the like.

Security of the user's identity may be achieved in a variety of ways. In one embodiment, a single trusted location. For example, a transaction privacy clearing house (TPCH) contains user data. The user interfaces with the TPCH using the user's transaction device. The user therefore does not fill out online the electronic purchase forms at every product vendor's website. The TPCH acts as a financial transaction middleman, stripping off user identity information from transactions. As a result, the user's private information is not stored in several databases across the Internet and in private business networks. The secure locations where the financial data is stored minimizes the possibilities that hackers can access the data or accidental releases of the data can occur. In one embodiment, multiple secure locations are utilized for storage to prevent theft of confidential information.

Figure 1:
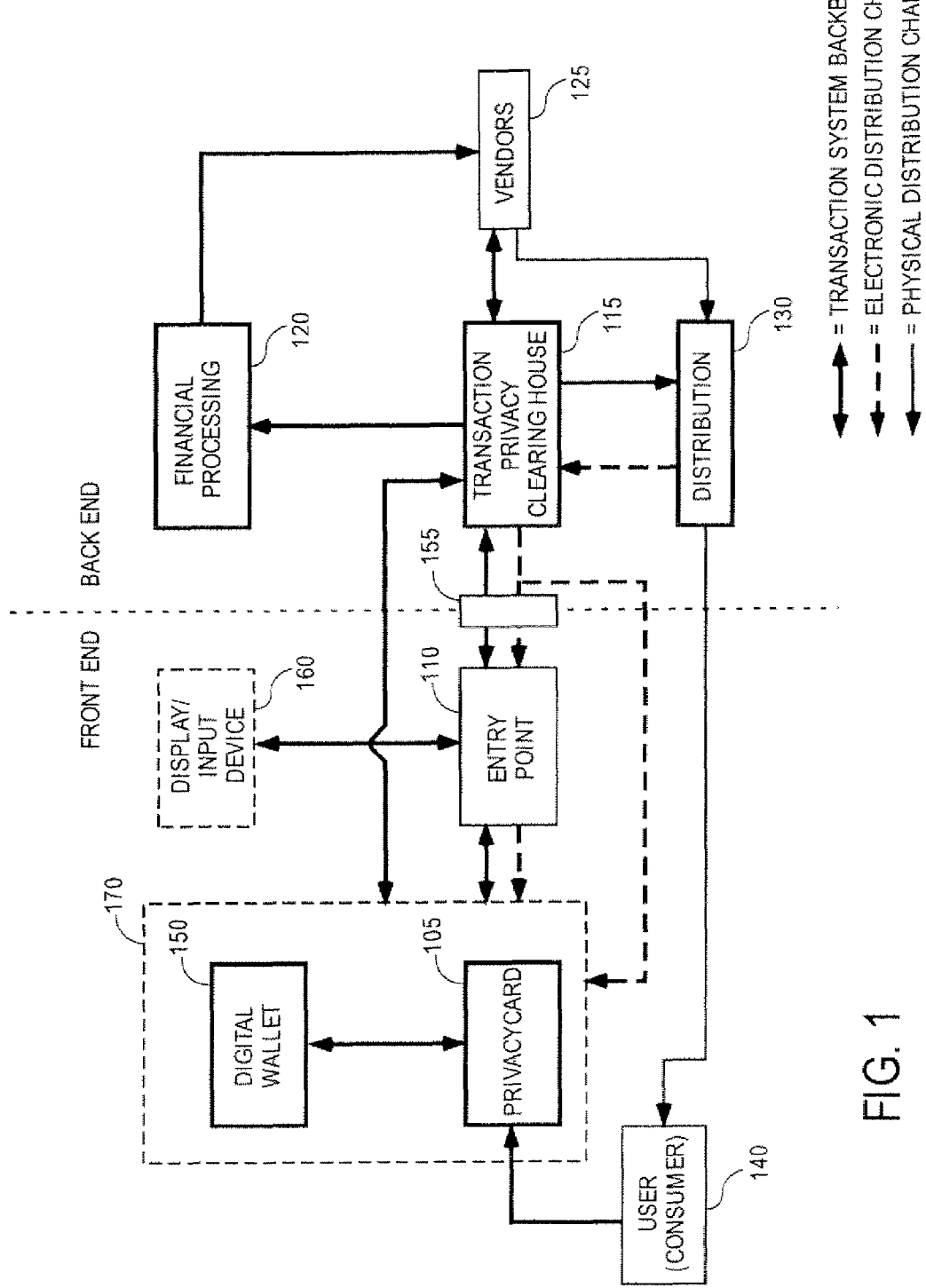
FIG. 1 is a simplified block diagram of one embodiment of a secure transaction system.

FIG. 1 is a simplified block diagram of one embodiment of a secure transaction system, which may be used in electronic commerce. As illustrated in FIG. 1, in this embodiment, a transaction privacy clearing house (TPCH) 115 interfaces a user (consumer) 140 and a vendor 125.

In this particular embodiment, a personal transaction device (PTD) 170, e.g., a privacy card 105, or a privacy card 105 coupled to a digital wallet 150, is used to maintain the privacy of the user while enabling the user to perform transactions. The personal transaction device 170 may include a window interface, a privacy card, a digital wallet, a point of sale terminal, a laptop computer, a desktop computer, a PDA, or any other device under the control of the user 140.

The personal transaction device 170 provides an interface for the user to exchange information. This exchange of information may include but is not limited to the user 140 receiving audio and/or visual content, instructions, requests, and the like from the personal transaction device 170. Further, this exchange of information may also include but is not limited to the personal transaction device 170 receiving instructions, payment authorization, authentication, and the like from the authorized user 140.

In one embodiment, the personal transaction device 170 is a fixed window interface within kiosk at a mall. Both the mobile window interface and the fixed window interface may be available for use by the general public if installed on public transportation or in public areas. In one embodiment, both the mobile window interface and the fixed window interface display information to the user and allows information to be entered by the user through the same display. In one embodiment, a user authentication mechanism such as a fingerprint recognition unit or other mechanism may be built directly into the card. In addition, the personal transaction device 170 may also contain wireless data communication, data storage and communication protocols for selectively communicating with outside devices such as a digital wallet described herein, point-of-sale terminal, or personal computer, and digital televisions.

In one embodiment, the personal transaction device 170 is configured to manage and control access to content and/or transactions received by individual accounts associated with the users of the personal transaction device. In one embodiment, the personal transaction 170 is configured to control the individual accounts by way of entering a unique biometric identifier associated with that particular account. Further, the user may select different information by entering unique biometric identifiers through the personal transaction device 170.

In an alternate embodiment, account management and control of access to content is achieved through the PTD 170. The PTD 170 may assign particular accounts with varying levels of content access and may place accounts into convenient groupings for account management.

In one embodiment, the personal transaction device 170 is configured to automatically handle contextual information and share this information with appropriate parties on behalf of the user.

In an alternate embodiment, the PTD 170 may be any suitable device that allows unrestricted access to TPCH 115. In one embodiment, the personal transaction device 170 may include a full screen that covers one side of the card. Alternately, in one embodiment in which the personal transaction device 170 is one embodiment of a privacy card, the privacy card may be coupled to device such as a digital wallet described herein, that provides a display. In one embodiment, the screen may be touch sensitive and be used for data input as well as output. In one embodiment, a user authentication mechanism such as a fingerprint recognition or other mechanism may be built directly into the card. Furthermore, the privacy card may have a wireless communication mechanism for input and output.

A variety of user interfaces may be used. In one embodiment, and input device may be incorporated on the transaction device. Alternately, a supplemental input device may be coupled to the transaction device. In one embodiment, an input device may be provided on a digital wallet coupled to a privacy card. User inputs may be provided on the point-of-sale terminals including a personal point-of-sale terminal.

The personal transaction device information is provided to the TPCH 115 that then indicates to the vendor 125 and the user 140 approval of the transaction to be performed. The transaction device utilizes an identification to maintain confidentiality of the user's identity by applying the transaction device identification and the identity of the entity performing the transaction. Thus, all transactions, from the vendor's perspective, are performed with the transaction device.

In order to maintain confidentiality of the identity of the user 140, the transaction device information does not provide user identification information. Thus, the vendor 125 or other entities do not have user information but rather transaction device information. The TPCH 115 maintains a secure database of transaction device information and user information. In one embodiment, the TPCH 115 interfaces to at least one financial processing system 120 to perform associated financial transactions, such as confirming sufficient funds to perform the transaction, and transfers to the vendor 125 the fees required to complete the transaction. In addition, the TPCH 115 may also provide information through a distribution system 130 that, in one embodiment, can provide a purchased product to the user 140, again without the vendor 125 knowing the identification of the user 140. In an alternate embodiment, the financial processing system 120 need not be a separate entity but may be incorporated with other functionality. For example, in one embodiment, the financial processing system 120 may be combined with the TPCH 115 functionality.

In one embodiment, the financial processing system (FP) 120 performs tasks of transferring funds between the user's account and the vendor's account for each transaction. In one embodiment, the presence of the TPCH a 115 means that no details of the transactions, other than the amount of the transactions and other basic information, are known to the FP 120. The TPCH 115 issues transaction authorizations to the FP 120 function on an anonymous basis on behalf of the user over a highly secure channel. The FP 120 does not need to have many electronic channels receiving requests for fund transfer, as in a traditional financial processing system. In one embodiment, a highly secure channel is set up between the TPCH 1 15 and the FP 120; thus, the FP 120 is less vulnerable to spoofing.

In one embodiment, the TPCH 115 contacts the FP 120 and requests a generic credit approval of a particular account. Thus, the FP 120 receives a minimal amount of information. In one embodiment, the transaction information, including the identification of goods being purchased with the credit need not be passed to the FP 120. The TPCH 115 can request the credit using a dummy charge ID that can be listed in the monthly financial statement sent to the user, so that the user can reconcile his financial statement. Further, the personal transaction device 170 can include functionality to cause the financial statement to convert the dummy charge ID back to the transactional information so that the financial statement appears to be a conventional statement that lists the goods that were purchased and the associated amount charged.

A display input device 160 (shown in phantom) may be included to enable the user, or in some embodiments the vendor 125, to display status and provide input regarding the PTD 170 and the status of the transaction to be performed.

In yet another embodiment, an entry point 110 interfaces with the personal transaction device 170 and also communicates with the TPCH 115. The entry point 110 may be an existing (referred to herein as a legacy POS terminal) or a newly configured point of sale (POS) terminal located in a retail environment. The user 140 uses the PTD 170 to interface to the POS terminal in a manner similar to how credit cards and debit cards interface with POS terminals. The entry point 110 may also be a public kiosk, a personal computer, or the like.

In another embodiment, the PTD 170 interfaces through a variety of interfaces including wireless interfaces such as BlueTooth and infrared transmission; contactless transmission such as FeliCa and AmexBlue; and plug-in port transmission such as USB and RS-232C. A stand-in processor 155 (STIP) can interface with the PTD 170 in the event that the connection between the front end and the back end is disrupted for any reason. This way, the PTD 170 can gain authorization for a specified floor limit without necessarily receiving authorization from the back end. Further, this limits the amount of authorization thus minimizing fraud and insufficient funds.

The system described herein also provides a distribution functionality 130 whereby products purchased via the system are distributed. In one embodiment, the distribution function 130 is integrated with the TPCH 115 functionality. In an alternate embodiment, the distribution function 130 may be handled by a third party. Utilizing either approach, the system ensures user privacy and data security. The distribution function 130 interacts with the user through PTD 170 to ship the product to the appropriate location. A variety of distribution systems are contemplated, for example, electronic distribution through a POS terminal coupled to the network, electronic distribution direct to one or more privacy cards and/or digital wallets, or physical product distribution. In one embodiment for physical product distribution, an "anonymous drop-off point", such as a convenience store or other ubiquitous location is used. In another embodiment, it involves the use of a "package distribution kiosk" that allows the user to retrieve the package from the kiosk in a secure fashion. However, in one embodiment, the user may use PTD 170 to change the shipping address of the product at any time during the distribution cycle.

A user connects to and performs transactions with a secure transaction system (such as shown in FIG. 1) through a personal transaction device (PTD) that has a unique identifier (ID). In one embodiment, a privacy card is used. In an alternate embodiment a digital wallet is used. In yet another alternate embodiment, a privacy card in conjunction with a digital wallet are used.

Figure 2:
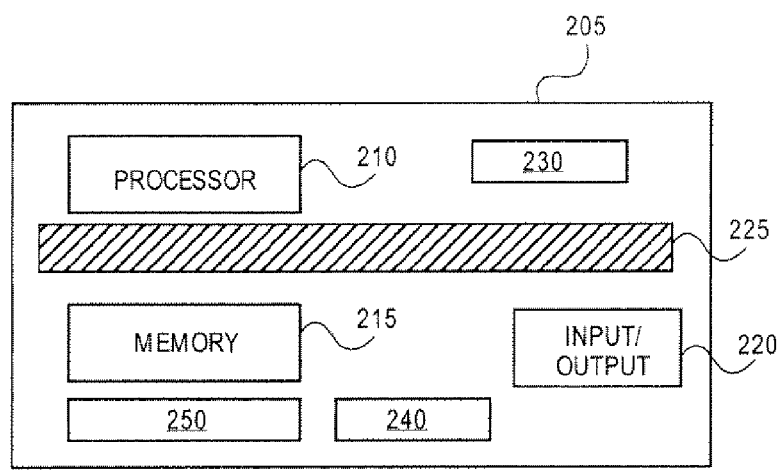
FIG. 2 is a simplified block diagram of one embodiment of a privacy card for a personal transaction device.

FIG. 2 is a simplified block diagram of one embodiment of a privacy card 205 for a personal transaction device. As illustrated in FIG. 2, in one embodiment, the card 205 is configured to be the size of a credit card. The privacy card includes a processor 210, memory 215 and input/output logic 220. The processor 210 is configured to execute instructions to perform the functionality herein. The instructions may be stored in the memory 215. The memory is also configured to store data, such as transaction data and the like. In one embodiment, the memory 215 stores the transaction ID used to perform transactions in accordance with the teachings of the present invention. Alternately, the processor may be replaced with specially configured logic to perform the functions described here.

The input/output logic 220 is configured to enable the privacy card 205 to send and receive information. In one embodiment, the input/output logic 220 is configured to communicate through a wired or contact connection. In another embodiment, the logic 220 is configured to communicate through a wireless or contactless connection. A variety of communication technologies may be used.

In one embodiment, a display 225 is used to generate bar codes scanable by coupled devices and used to perform processes as described herein. The privacy card 205 may also include a magnetic stripe generator 240 to simulate a magnetic stripe readable by devices such as legacy POS terminals.

In one embodiment, biometric information, such as fingerprint recognition, is used as a security mechanism that limits access to the card 205 to authorized users. A fingerprint touch pad and associated logic 230 is therefore included in one embodiment to perform these functions. Alternately, security may be achieved using a smart card chip interface 250, which uses known smart card technology to perform the function.

Memory 215 can have transaction history storage area. The transaction history storage area stores transaction records (electronic receipts) that are received from POS terminals. The ways for the data to be input to the card include wireless communications and the smart card chip interface which functions similar to existing smart card interfaces. Both of these approaches presume that the POS terminal is equipped with the corresponding interface and can therefore transmit the data to the card.

Memory 215 can also have user identity/account information block. The user identity/account information block stores data about the user and accounts that are accessed by the card. The type of data stored includes the meta account information used to identify the account to be used.

In another embodiment, the memory 215 also stores the embedded content received by the privacy card.

In another embodiment, the memory 215 also stores the account management information such as categories and the account access levels of content.

In another embodiment, the memory 215 also stores the contextual information gathered by the personal transaction device.

Figure 3:
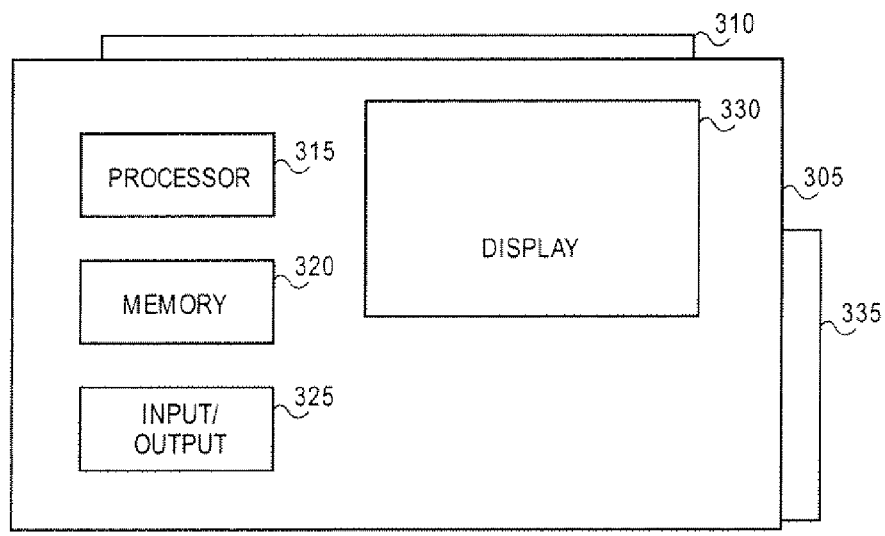
FIG. 3 is a simplified block diagram of one embodiment of a digital wallet for a personal transaction device.

FIG. 3 is a simplified block diagram of one embodiment for a personal transaction device 305. As illustrated in FIG. 3, the PTD 305 includes a coupling input 310 for the privacy card 205, processor 315, memory 320, input/output logic 325, display 330, and peripheral port 335. The processor 315 is configured to execute instructions, such as those stored in memory 320, to perform the functionality described herein. Memory 320 may also store data including financial information, eCoupons, shopping lists, embedded content, and the like. The PTD 305 may be configured to have additional storage. In one embodiment, the additional storage is in a form of a card that couples to the device through peripheral port 310.

In one embodiment, the privacy card 205 couples to the PTD 305 through port 310; however, the privacy card 205 may also couple to the PTD 305 through another form of connection including a wireless connection.

Input/output logic 325 provides the mechanism for the PTD 305 to communicate information. In one embodiment, the input/output logic 325 provides data to a point-of-sale terminal or to the privacy card 205 in a pre-specified format. The data may be output through a wired or wireless connection.

The PTD 305 may also include a display 330 for display of status information to the user. In one embodiment, the display 330 is a window display device. The window display device may display information and receive information through a transparent surface. For example, a window display device may be embodied as part of a vehicle windshield. The window display device projects information onto the windshield such that the user may view this information. The window display device also has an input component to receive user entered input through the window display device. For example, the window display device may include a touch sensitive interface, a heat sensitive interface, a light sensitive interface, and/or a motion sensitive interface. In one embodiment, the input component is overlaid and integrated with the area for displaying information to the user.

The transaction device enhances security by authenticating the user of the card prior to usage such that if that transaction device is useless in the hands of an unauthorized person. One means of authentication is some type of PIN code entry. Alternatively, authentication may be achieved by using more sophisticated technologies such as a biometric solution. This biometric solution can include fingerprint recognition, voice recognition, iris recognition, and the like. In addition, in one embodiment in which multiple transaction devices are used, it may be desirable to configure the first device to enable and program the second device in a secure manner. Thus, the means of communication between the first device in the second device may include mutual device verification such that an unauthorized first device may not be used to enable a particular second device that does not belong to the same or authorized user.

In one embodiment, the transaction device, point of sale terminals and/or TPCH may function to verify the authenticity of each other. For example the transaction device may be configured to verify the legitimacy of the point-of-sale terminal and/or TPCH. A variety of verification techniques may be used. For example, in one embodiment, the public key infrastructure may be used to verify the legitimacy of the user.

Communication protocols include those that allow the digital wallet to specify which of several possible data structures to use for a transaction and communication protocols that allow the digital wallet and other devices to securely share data with the transaction device. The transaction device may represent a single account such as a particular credit card, or it may represent multiple accounts such as a credit card, telephone card, and debit card.

In one embodiment, the transaction device is intended to be the means by which the user interfaces with the invention. In one embodiment, the transaction device stores e-commerce related data on behalf of the user including transaction histories, meta account information needed to carry out a transaction using the transaction privacy clearinghouse function of the system, and various content. In one embodiment, the meta account information may be an abstraction of the user's real identity as opposed to the actual user's name, address, etc. For example, the TPCH keeps records of the user's real bank account numbers, but assigned a different number for use by retailers and point-of-sale terminals. For example, and actual Bank Account No. may be 1234 0000 9876 1423 could be represented as 9999 9999 9999 9999. This number, in association with the transaction card's identification, could enable the TPCH to know that the bank account No. 1234 0000 9876 1423 was actually the account being used.

The purpose of this data is to abstract the user's identity while at the same time providing the necessary information for the transaction to be completed.

In one embodiment, the personalization process of the transaction device may be as described below. In this example, the transaction device is a digital wallet. The user turns on the transaction device. This can be accomplished by touching the finger print recognition pad or simply turning a switch. The transaction device performs at start a procedure, and recognizes that it has not yet been personalized. Thus, it first prompt the user to enter the secret pin code. If the pin code entry fails, the user is prompted again. Ideally the user is given a finite number of chances to enter the data. After the last failure, the device may permanently disable itself and thus becomes useless. It may also display a message requesting that the transaction device be returned to an authorized facility.

Assuming a successful pin code entry, the user may then be prompted to answer several of the security questions which were entered into the transaction device at processing center. Some of these questions might require data entry, and others might be constructed as simple multiple-choice, with both the correct as well as incorrect answers supplied. Assuming successful response to these questions, the user may then be prompted to enter secure personal identification information such as fingerprint data. In one embodiment, in which the fingerprint data is used, the user is prompted to enter fingerprint data by successively pressing one or more fingers against the recognition pad. The device prompt the user for each fingerprint that must be entered, for example, using a graphical image of a hand with the indicated finger.

The fingerprint data entry process may be performed at least twice to confirm that the user has entered the correct data. If confirmation succeeds, the device writes the fingerprint image data into their write once memory, or other memory that is protected from accidental modification. If confirmation fails, the user is prompted to start over with entry. Failure to reliably enter the fingerprint data after a finite number of tries will result in the device permanently disabling itself, and optionally providing an on-screen message to the user to go to secure processing facility such as a bank to complete the process. After successful personalization, the device is then ready to be used for the initial set of services that the user requested during the registration process. Once the device has been initialized for secure transactions, additional services could be downloaded to the device.

In one embodiment, the authentication of the identity of the user and selecting particular information by the user may be combined by the user providing a unique biometric input which corresponds to the particular selected information.

Figure 4:
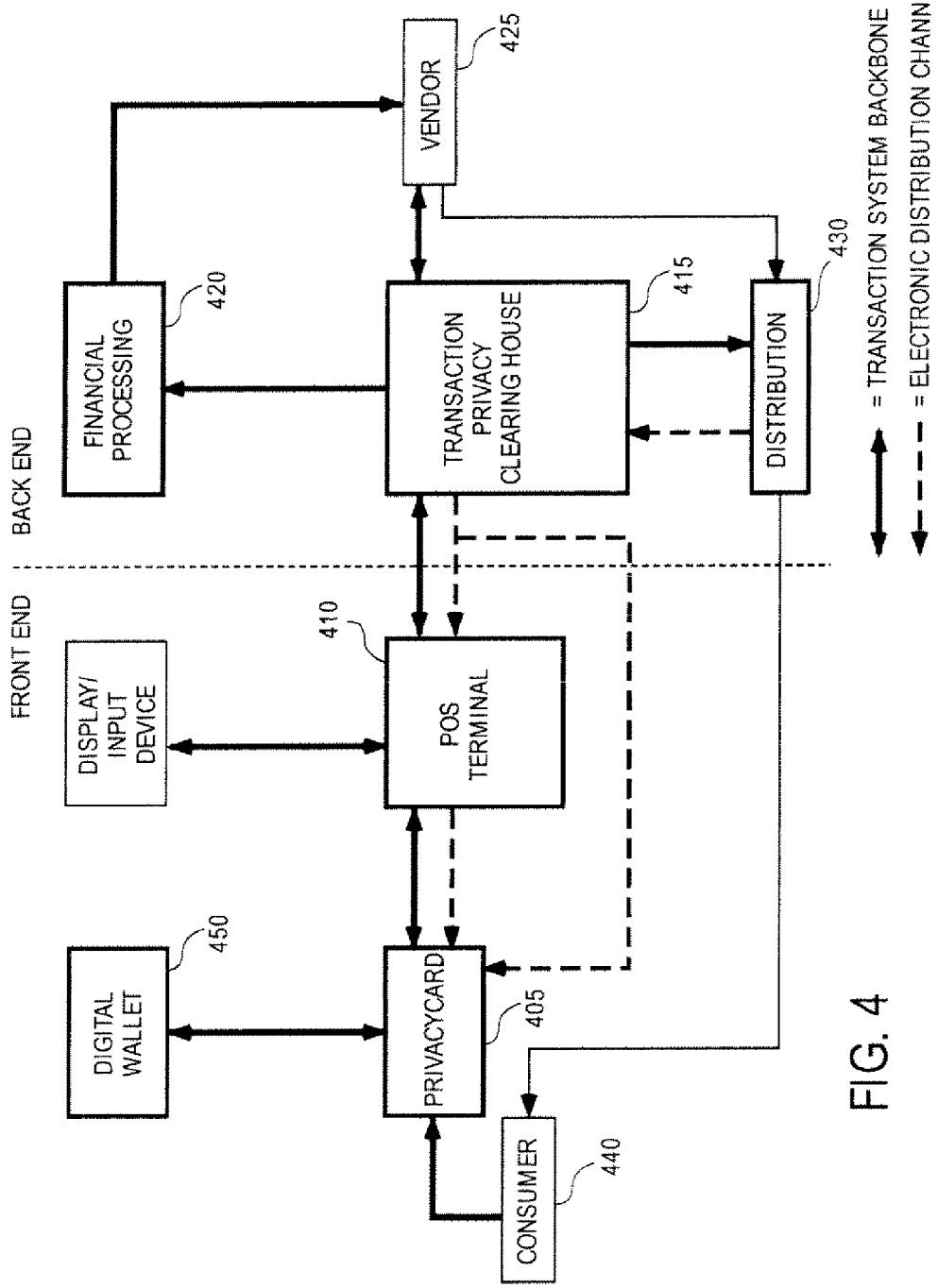
FIG. 4 is a simplified block diagram of one embodiment of a secure transaction system showing a point-of-sale terminal.

One embodiment of the system that utilizes a point-of-sale terminal is shown in FIG. 4. In this embodiment, the privacy card 405 interfaces with the point-of-sale terminal 410 and that point of sale terminal 410 communicates with that TPCH 415. That TPCH 415 interfaces with the financial processing system 420, the vendor 425 and the distribution system 430. The point-of-sale terminal may be an existing or newly configured point-of-sale terminal located in a retail environment. The user 440 uses the privacy card 405 to interface to the point-of-sale terminal a manner similar to how credit cards and debit cards interface with point-of-sale terminals. Alternately, a digital wallet 450 may be used by itself or with the privacy card 405 to interface to the point-of-sale terminal 410. Alternately, a memory device may be utilized solely as the interface with that point-of-sale terminal 410.

Figure 5:
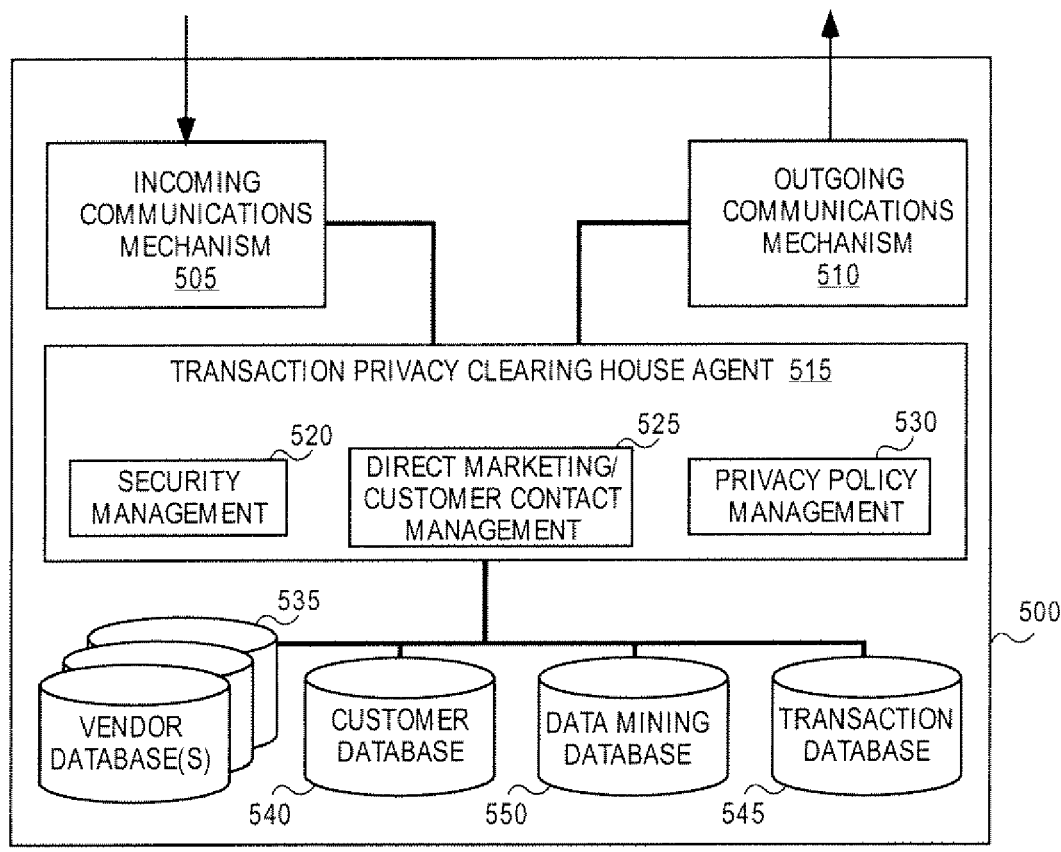
FIG. 5 is a simplified block diagram of one embodiment of a transaction privacy clearing house.

One embodiment of the TPCH is illustrated in FIG. 5. In one embodiment, the TPCH 500 is located at a secure location and is accessible to the transaction device. The TPCH 500 functions to provide the user with authorization to perform transactions without compromising the user's identity. The TPCH 500 may be embodied as a secure server connected to the transaction device in some form of direct connection or alternately a format in direct connection over the Internet or point-of-sale network.

Incoming communications mechanism 505 and outgoing communications mechanism 510 are the means of communicating with external retailers and vendors, as well as the transaction device such as the digital wallet. A variety of communication devices may be used, such as the Internet, direct dial-up modem connections, wireless, cellular signals, etc.

The TPCH agent 515 handles system management and policy control, informs their core functionality of the TPCH 500. In one embodiment, within the entire system, there is one clearinghouse agent, which resides permanently at the clearinghouse. Among the responsibilities handled by the agent include internal system management functions such as data mining, financial settlement and allocation of payments to internal and external accounts, embedded content management, and registration of new users joining the system.

The security management functions 520 ensure secure communications among the component internal to the TPCH 500 and the entities external to the TPCH 500. This function includes participating in secure communications protocols to open and maintain secure connections. This ensures that only authorized entities are allowed to access to data and that only authorized transaction devices can execute transactions against a user's account.

The TPCH agent 515 also provides a direct marketing and customer contact service 525, which in one embodiment is a data access control mechanism and maintain separate, secure access between various client and their databases. The data access control mechanism ensures that vendors have access only to the appropriate data in order to carry out the tasks of the system. One of the key features at the TPCH 500, the ability to carry out focused direct marketing while maintaining the privacy and identity protection of consumer, is handled by this mechanism.

The TPCH agent 515 can be configured to actively look for content on behalf of the user as well as filter out unwanted incoming information. In one embodiment, the data may be described by XML and the agent may operate via Java applets.

Figure 6A:
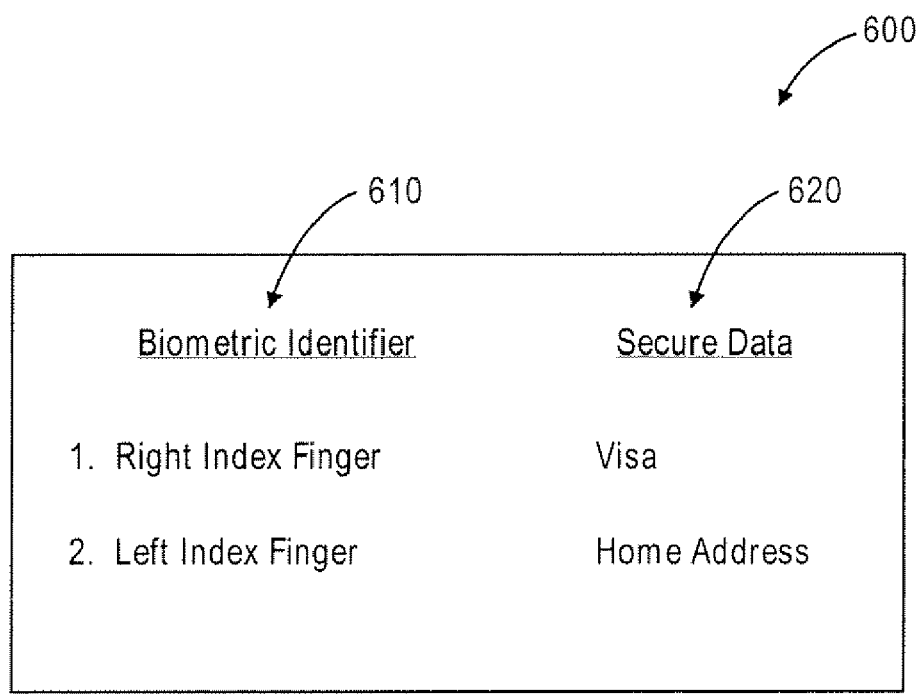
FIG. 6A is a simplified representation of one embodiment of profile information.

FIG. 6A illustrates one embodiment of a stored profile information 600. The stored profile information 600 may be locally stored within a personal transaction device or remotely stored at a secured location. The stored profile information 600 includes biometric identifier data 610 and secure data 620. In one embodiment, the biometric identifier data 610 corresponds to unique information identifying each fingerprint belonging to a user. In one embodiment, the secure data 620 includes any data in which the user associates with a unique biometric identifier. For example, under the biometric identifier data 610, the right index finger corresponds to the Visa account information under the secure data 620. Similarly, the left index finger under the biometric identifier data 610 corresponds with the home address information under the secure data 620. In other embodiments, varying types of biometric identifiers such as iris scans, palm scans, and the like may be utilized as the biometric identifier data 610.

Figure 6B:
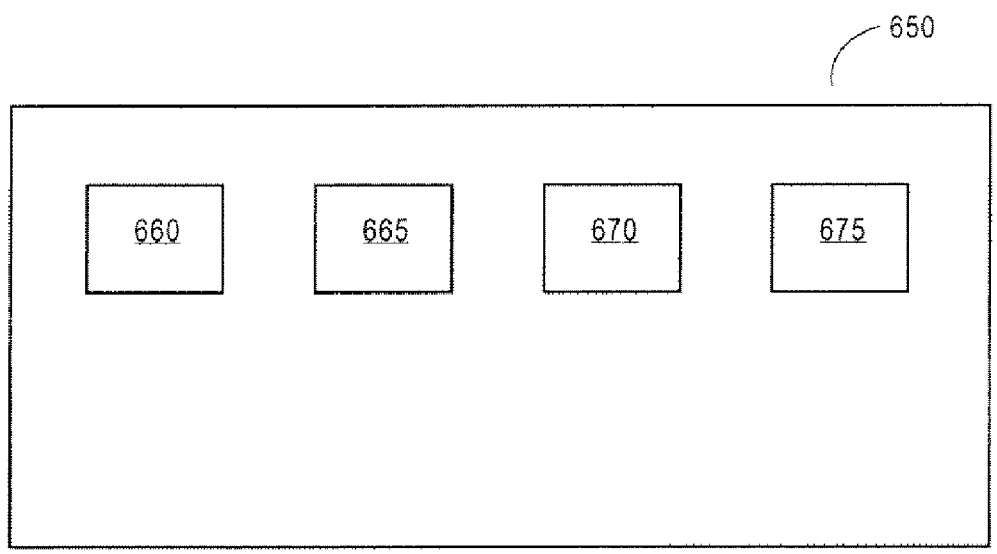
FIG. 6B is a simplified block diagram of one embodiment of a personal transaction device.

FIG. 6B illustrates a simplified block diagram of a personal transaction device 650 according to one embodiment. The personal transaction device 650 includes an input module 660 for receiving a biometric input from the user; a matching module 665 for comparing the biometric input to a plurality of stored biometric identifiers; an output module 670 for outputting a secure data corresponding with one of the plurality of the stored biometric identifiers in response to the biometric input; and a storage module 675 for storing the plurality of biometric identifiers and a corresponding plurality of secure data.

Figure 7:
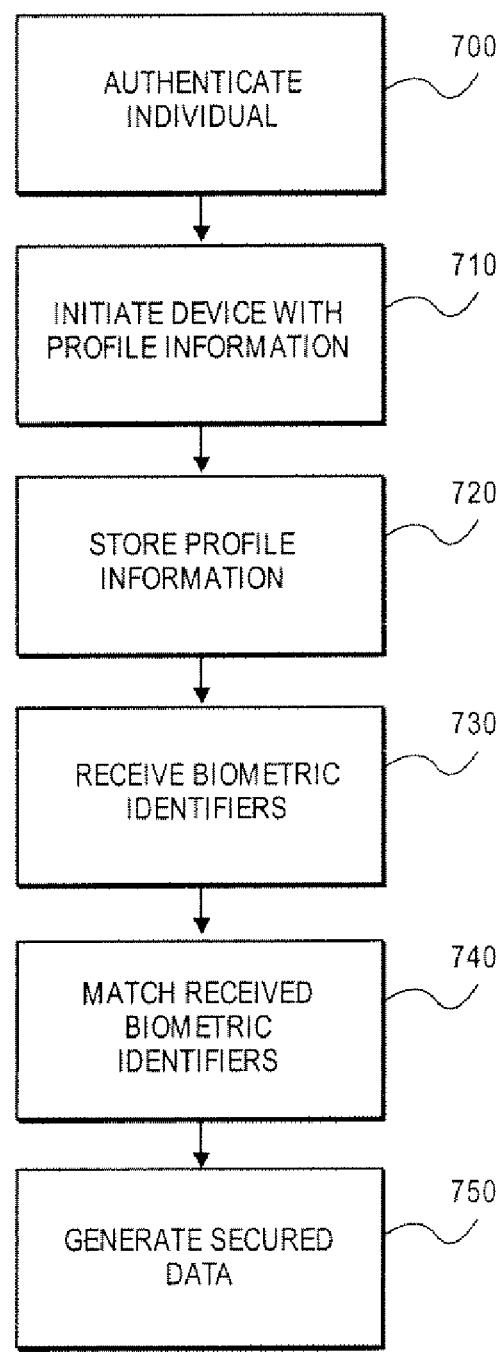
FIG. 7 illustrates a flow diagram of one embodiment of utilizing the personal transaction device.

The operation of the system of FIG. 2 while a user interacts with the fingerprint touch pad and associated logic 230 is described with references to the flow diagram shown in FIG. 7.

The flow diagram as depicted in FIG. 7 is merely one embodiment of the invention. The blocks may be performed in a different sequence without departing from the spirit of the invention. Further, blocks may be deleted, added or combined without departing from the spirit of the invention.

In Block 700, authentication of the identity of the user is confirmed by either receiving a token, receiving a PIN, receiving a biometric parameter, or the like. In Block 710, profile information is entered and/or edited. An exemplary form of profile information is described and shown in FIG. 6.

In Block 720, the profile information is stored either locally within the device or remotely. In Block 730, the device receives a biometric parameter from the user as input. In Block 740, the received biometric parameter is matched with a biometric identifier within the profile information. In Block 750, the device outputs secure data which corresponds with the received biometric parameter.

For example, in one specific embodiment, a consumer receives a new personal transaction device such as a Digital Wallet which is equipped with a biometric fingerprint identifier. The consumer also current possess three credit cards, one checking account, one savings account, one stock brokerage account, one ImageStation account, a driver's license, one mortgage account, and six ongoing monthly services. In this example, the three credit cards are Visa, Mastercard, and Discover; the six ongoing monthly services are electricity, water, gas, cable, cellular phone, and garbage collection. In this embodiment, the consumer-centric information such as biometric information, consumer name, social security number, mother's maiden name, personal identification number (PIN) are all stored locally on the digital wallet.

A secure link to the consumer's identity is accomplished through an association of a unique identification of the device with the consumer's biometric identifier. Exemplary biometric identifiers include fingerprints, iris scans, hairs, blood samples, skin samples, and the like. An initialization of the new consumer is performed in order to verify the identity of the user. Further, the initialization also includes a registration and recognition of each fingerprint. Once the initialization is accomplished, the consumer may make selections for preferences. These consumer defined preferences may include limits on automatic payment events, selection of default bank accounts, selection of default credit card accounts, selection of shipping address, and the like. Each of the preferences is assigned to be associated with a particular fingerprint.

After the registration and assigning process, the consumer may utilize a particular fingerprint to respond to a request for information such as which credit card to use for purchase of a product.

In the event of loss, breakage, or theft of the Digital Wallet, the consumer would only be required to register each fingerprint.

In one embodiment, the consumer may register each fingerprint in the following manner: a driver's license assigned to a left index finger; a PIN assigned to a left pinkie finger; a social security number assigned to a right pinkie finger; a Visa credit card assigned to a right index finger; a MasterCard credit card assigned to a right middle finger; a Discover credit card assigned to a right ring finger; a checking account assigned to a right thumb; a home address assigned to a left thumb finger; a business address assigned to a left middle finger; and an alternate home address assigned to a left ring finger.

In one embodiment, utilizing the above-mentioned fingerprint assignments, a consumer desires to purchase a television via the Internet. The particular television is selected from the merchant website. When prompted for payment by the merchant website, the consumer identifies himself/herself by supplying a driver's license and PIN by responding with a combination of a left index finger and a left pinkie finger. Next, the merchant website may prompt the consumer for payment, and the consumer may choose to pay with a Discover credit card by responding with the right ring finger. The merchant website may prompt the consumer for a delivery address, and the consumer may choose to have the television delivered to the consumer's home address by responding with the left thumb finger.

By using a series of fingerprint entries, the consumer is able to successfully purchase merchandise via the Internet. It is apparent to one with ordinary skill in the art that other tasks may also be accomplished by supplying a single or series of fingerprint inputs to identify the user as well as to provide instructions.

The foregoing descriptions of specific embodiments of the invention have been presented for purposes of illustration and description.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A device for interfacing with a user comprising:
a plurality of stored biometric identifiers specific to the user, each biometric identifier corresponding to a different biometric parameter specific to the user, wherein each stored biometric identifier is operatively linked to a separate section of a profile, the profile comprising account information for the user;
an input interface to receive at least two input biometric parameters from the user;
a matching module coupled to the input interface to compare each input biometric parameter to the plurality of stored biometric identifiers; and
an output interface coupled to the matching module to output secure data for the section of the profile operatively linked to the stored biometric identifiers that match the input biometric parameters.

2. The device according to claim 1 wherein the biometric parameter is a fingerprint.

3. The device according to claim 1 wherein a type of secure data is one of address information, credit card information, social security number, and PIN.

4. The device according to claim 1 further comprising a storage module coupled to the matching module for storing the plurality of biometric identifiers and an associated plurality of secure data.

5. The device according to claim 1 wherein the plurality of biometric identifiers comprises a fingerprint of a first finger of the user and a fingerprint of a second finger of the user.

6. A computerized method comprising:
receiving at least two input biometric parameters from a user;
matching the input biometric parameters with selected biometric identifiers from among a plurality of biometric identifiers specific to the user, each biometric identifier corresponding to a different biometric parameter specific to the user; and
outputting secure data sections of a profile that are operatively linked to the selected biometric identifiers, wherein each of the plurality of biometric identifiers is operatively linked to a separate section of the profile, the profile comprising account information for the user.

7. The method according to claim 6 further comprising storing the plurality of biometric identifiers and corresponding plurality of secure data.

8. The method according to claim 6 wherein the biometric parameter is a fingerprint from the user.

9. The method according to claim 6 wherein the plurality of biometric identifiers comprises a fingerprint of a first finger of the user and a fingerprint of a second finger of the user.

10. The method according to claim 6 wherein a type of the secure data is one of address information, credit card information, social security number, and PIN.

11. A computerized method comprising:
receiving a plurality of input biometric parameters from a user, wherein each biometric parameter is different and specific to the user;
forming a plurality of biometric identifiers based on the plurality of input biometric parameters; and
operatively linking a separate section of a profile with each biometric identifiers, the profile comprising account information for the user.

12. The method according to claim 11 further comprising authenticating an identity of the user based on one of the biometric parameters.

13. The method according to claim 11 further comprising storing secure data for a section of the profile and the corresponding biometric parameter.

14. The method according to claim 11 wherein one of the biometric parameters is a fingerprint of the user.

15. The method according to claim 11 wherein one of the biometric parameters is a fingerprint of a first finger of the user and a fingerprint of a second finger of the user.

16. A computer-readable medium having computer executable instructions for performing a method comprising:
receiving at least two input biometric parameters from a user;
matching the input biometric parameters with selected biometric identifiers from among a plurality of biometric identifiers specific to the user, each biometric identifier corresponding to a different biometric parameter specific to the user; and
outputting secure data sections of a profile operatively linked to the selected biometric identifiers, wherein each of the plurality of biometric identifiers is operatively linked to a separate section of the profile, the profile comprising account information for the user.

* * * * *